US009679199B2

(12) United States Patent
Wilson et al.

(10) Patent No.: US 9,679,199 B2
(45) Date of Patent: Jun. 13, 2017

(54) FUSING DEVICE AND IMAGE MOTION FOR USER IDENTIFICATION, TRACKING AND DEVICE ASSOCIATION

(71) Applicant: Microsoft Corporation, Redmond, WA (US)

(72) Inventors: Andrew D. Wilson, Seattle, WA (US); Hrvoje Benko, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 537 days.

(21) Appl. No.: 14/096,840

(22) Filed: Dec. 4, 2013

(65) Prior Publication Data

US 2015/0154447 A1   Jun. 4, 2015

(51) Int. Cl.
*G06K 9/00* (2006.01)
*G06F 1/16* (2006.01)
*G06F 3/03* (2006.01)
*G06F 3/038* (2013.01)
*G06F 3/0346* (2013.01)
*A63F 13/211* (2014.01)
*A63F 13/213* (2014.01)
(Continued)

(52) U.S. Cl.
CPC ........ *G06K 9/00624* (2013.01); *A63F 13/211* (2014.09); *A63F 13/213* (2014.09); *A63F 13/42* (2014.09); *G06F 1/1694* (2013.01); *G06F 3/0304* (2013.01); *G06F 3/038* (2013.01); *G06F 3/0346* (2013.01); *G06T 7/248* (2017.01); *G06F 2200/1637* (2013.01)

(58) Field of Classification Search
CPC ........... G06K 9/00624; G06K 9/00771; G06K 9/6288; G06F 1/1694; G06F 3/0304; G06F 3/0346; G06F 3/038; G06F 2200/1637; G06T 7/0044; G06T 7/204; A63F 13/211; A63F 13/213
See application file for complete search history.

(56) References Cited

U.S. PATENT DOCUMENTS 7,236,091 B2   6/2007   Kiang et al.
7,583,275 B2   9/2009   Neumann et al.
(Continued)

OTHER PUBLICATIONS

Stein et al., "Accelerometer Localization in the View of aStationary Camera", May 30, 2012, IEEE, 2012 9th Conf. on Computer and Robot Vision, p. 109-116.*
(Continued)

*Primary Examiner* — Chan Park
*Assistant Examiner* — Timothy Choi
(74) *Attorney, Agent, or Firm* — Lyon & Harr, LLP; Katrina A. Lyon

(57) ABSTRACT

The cross-modal sensor fusion technique described herein tracks mobile devices and the users carrying them. The technique matches motion features from sensors on a mobile device to image motion features obtained from images of the device. For example, the acceleration of a mobile device, as measured by an onboard internal measurement unit, is compared to similar acceleration observed in the color and depth images of a depth camera. The technique does not require a model of the appearance of either the user or the device, nor in many cases a direct line of sight to the device. The technique can operate in real time and can be applied to a wide variety of ubiquitous computing scenarios.

20 Claims, 9 Drawing Sheets

(51) Int. Cl.
    A63F 13/42    (2014.01)
    G06T 7/246    (2017.01)

(56) References Cited

U.S. PATENT DOCUMENTS

| | | | |
|---|---|---|---|
| 7,761,233 | B2 | 7/2010 | Schott et al. |
| 8,380,246 | B2 | 2/2013 | Wilson et al. |
| 8,548,608 | B2 | 10/2013 | Perek et al. |
| 2006/0240866 | A1* | 10/2006 | Eilts .................... G06F 1/3203 455/556.1 |
| 2010/0197390 | A1 | 8/2010 | Craig et al. |
| 2013/0046505 | A1 | 2/2013 | Brunner et al. |
| 2013/0069931 | A1 | 3/2013 | Wilson et al. |
| 2013/0113704 | A1 | 5/2013 | Sarrafzadeh et al. |
| 2013/0162778 | A1 | 6/2013 | Kurokawa |
| 2013/0166202 | A1 | 6/2013 | Bandyopadhyay et al. |

OTHER PUBLICATIONS

Shi et al., "A Rotation Based Method for Detecting On-body Positions of Mobile Devices", Sep. 21, 2011, ACM, Proceedings of 13th Int. Conf. on Ubiquitous Computing, Ubicomp'11, p. 559-560.*

Brox, et al., "High Accuracy Optical Flow Estimation Based on a Theory for Warping", In Proceedings of 8th European Conference on Computer Vision, Springer, vol. 4, May, 2004, 12 pages.

Hinckley, Ken, "Synchronous Gestures for Multiple Persons and Computers", In Proceedings of the 16th Annual ACM Symposium on User Interface Software and Technology, Jul. 9, 2009, 10 pages.

Holmquist, et al., "Smart-Its Friends: A Technique for Users to Easily Establish Connections Between Smart Artefacts", In Proceedings of Third International Conference on Ubiquitous Computing, Sep. 2001, 6 pages.

Kawai, et al., "Identification and Positioning Based on Motion Sensors and a Video Camera", In Proceedings of 4th IASTED International Conference on Web-Based Education, Feb. 21, 2005, 7 pages.

Kozlowski, et al., "Recognizing the Sex of a Walker From Dynamic Point-Light Display", In Journal of Perception & Psychophysics, vol. 21, Issue 6, Nov. 1977, 7 pages.

Marquardt, et al., "Cross-Device Interaction via Micro-Mobility and F-Formations", In Proceedings of the 25th Annual ACM Symposium on user Interface Software and Technology, Oct. 7, 2012, 10 pages.

Mayrhofer, et al., "Shake Well Before Use: Intuitive and Secure Pairing of Mobile Devices", In IEEE Transactions on Mobile Computing, vol. 8, Issue 6, Jun. 2009, 15 pages.

Olwal, et al., "Surface Fusion: Unobtrusive Tracking of Everyday Objects in Tangible Interfaces", In Proceedings of the Conference of Graphics Interface, May 28, 2008, 8 pages.

Perera, et al., "Context Aware Computing for the Internet of Thing: A Survey", In IEEE Communications Surveys & Tutorials, May 3, 2013, 41 pages.

Plotz, et al., "Automatic Synchronization of Wearable Sensors and Video-Cameras for Ground Truth Annotation—A Practical Approach", In Proceedings of 16th International Symposium on Wearable Computers, Jun. 18, 2012, 4 pages.

Rekimoto, et al., "SyncTap: An Interaction Technique for Mobile Networking", In Proceedings of 5th International Symposium on Human-Computer Interaction with Mobile Devices and Services, Sep. 8, 2003, 12 pages.

Rofouei, et al., "Your Phone or Mine?: Fusing Body, Touch, and Device Sensing for Multi-User Device-Display Interaction", In Proceedings of the SIGCHI Conference on Human Factors in Computing Systems, May 5, 2012, 4 pages.

Schmidt, et al., "PhoneTouch: A Technique for Direct Phone Interaction on Surfaces", In Proceedings of the 23nd Annual ACM Symposium on User Interface Software and Technology, Oct. 3, 2010, 4 pages.

Shigeta, et al., "Identifying a Moving Object with an Accelerometer in a Camera View", In International Conference on Intelligent Robots and Systems, Sep. 22, 2008, 6 pages.

Smith, et al., "A Wirelessly-Powered Platform for Sensing and Computation", In Proceedings of 8th International Conference on Ubiquitous Computing, Sep. 17, 2006, 12 pages.

Teixeira, et al., "Tasking Networked CCTV Cameras and Mobile Phones to Identify and Localize Multiple People", In Proceedings of the 12th ACM International Conference on Ubiquitous Computing, Sep. 26, 2010, 10 pages.

Want, et al., "The Active Badge Location System", In Journal of ACM Transactions on Information Systems, vol. 10, Issue 1, Jan. 1992, 12 pages.

Weenk, et al., "Automatic Identification of Inertial Sensor Placement on Human Body Segments During Walking", In Journal of Neuro Engineering and Rehabilitation, Mar. 21, 2013, 9 pages.

Welch, et al., "An Introduction to the Kalman Filter", In Technical Report TR 95-041, Retrieved on: Oct. 16, 2013, 16 pages.

Wilson, A., "BlueTable: Connecting Wireless Mobile Devices on Interactive Surfaces Using Vision-Based Handshaking", In Proceedings of Graphics Interface, May 28, 2007, 7 pages.

Wolfe, Jeremy M., "Guided Search 2.0: A Revised Model of Visual Search", In Journal of Psychonomic Bulletin & Review, vol. 1, Issue 2, Jan. 1994, 37 pages.

"Search Report and Written Opinion Issued in PCT Patent Application No. PCT/US2014/067517", Mailed Date: Feb. 17, 2015, 10 Pages.

"Second Written Opinion Issued in PCT Patent Application No. PCT/US2014/067517", Mailed Date: Oct. 27, 2015, 7 Pages.

"International Preliminary Report on Patentability Issued in PCT Application No. PCT/US2014/067517", Mailed Date: Jan. 25, 2016, 8 Pages.

* cited by examiner

FUSING DEVICE AND IMAGE MOTION FOR USER IDENTIFICATION, TRACKING AND DEVICE ASSOCIATION

BACKGROUND

The ability to track the position of a mobile device and its owner in indoor settings is useful for a number of ubiquitous computing scenarios. Tracking a smart phone can be used to identify and track the smart phone's owner in order to provide indoor location-based services, such as establishing the smart phone's connection with nearby infrastructure such as a wall display, or for providing the user of the phone location-specific information and advertisements.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The cross-modal sensor fusion technique described herein provides a cross-modal sensor fusion approach to track mobile devices and the users carrying them. The technique matches motion features captured using sensors on a mobile device to motion features captured in images of the device in order to track the mobile device and/or its user. For example, in one embodiment the technique matches the velocities of a mobile device, as measured by an onboard measurement unit, to similar velocities observed in images of the device to track the device and any object rigidly attached there to (e.g., a user). This motion feature matching process is conceptually simple. The technique does not require a model of the appearance of either the user or the device, nor in many cases a direct line of sight to the device. In fact, the technique can track the location of the device even when it is not visible (e.g., it is in a user's pocket). The technique can operate in real time and can be applied to a wide variety of scenarios.

In one embodiment, the cross-modal sensor fusion technique locates and tracks a mobile device and its user in video using accelerations. The technique matches the mobile device's accelerations with accelerations observed in images (e.g., color and depth images) of the video on a per pixel basis, computing the difference between the image motion features and the device motion features at a number of pixel locations in one or more of the captured images. The number of pixels can be predetermined if desired, as can the pixel locations that are selected. The technique uses the inertial sensors common to many mobile devices to find the mobile device's acceleration. Device and image accelerations are compared in the 3D coordinate frame of the environment, thanks to the absolute orientation sensing capabilities common in today's mobile computing devices such as, for example, smart phones, as well as the range sensing capability of depth cameras which enables computing the real world coordinates (meters) of image features. The device and image accelerations are compared at a predetermined number of pixels at various locations in an image. The smallest difference indicates the presence of the mobile device at the location.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
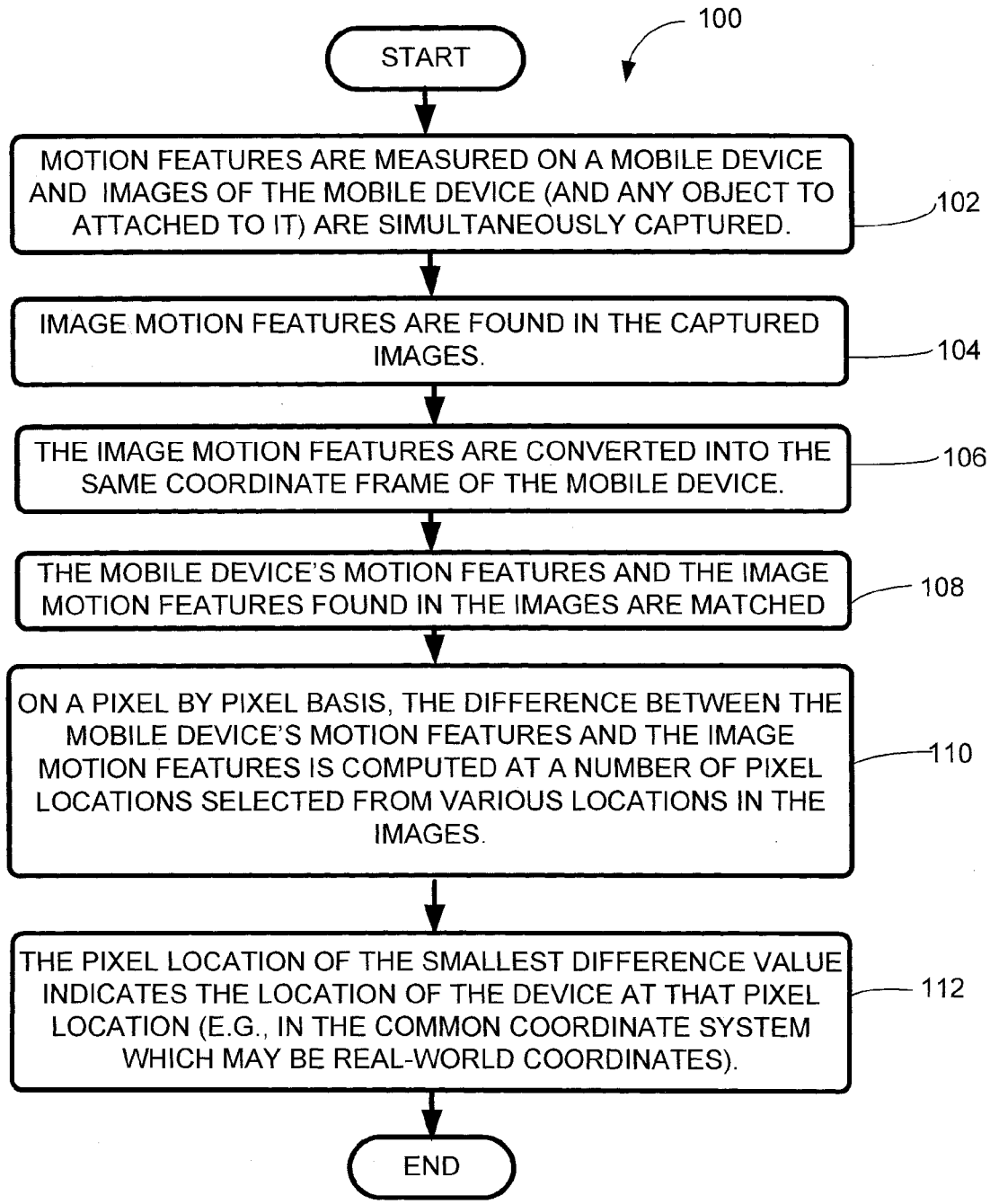
FIG. 1 depicts a flow diagram of a process for practicing one exemplary embodiment of the cross-modal sensor fusion technique described herein.

In the following description of the cross-modal sensor fusion technique, reference is made to the accompanying drawings, which form a part thereof, and which show by way of illustration examples by which the cross-modal sensor fusion technique described herein may be practiced. It is to be understood that other embodiments may be utilized and structural changes may be made without departing from the scope of the claimed subject matter.

1.0 Cross-Modal Sensor Fusion Technique

The following sections provide an introduction to the cross-modal sensor fusion technique, a discussion of sensor fusion, as well as exemplary embodiments of processes and a system for practicing the technique. Details of various embodiments and components of the cross-modal sensor fusion technique are also provided.

As a preliminary matter, some of the figures that follow describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

1.1 Introduction

The ability to track the position of a mobile device and its owner in indoor settings is useful for a number of scenarios. However, many smart phones are small, shiny, and dark in color, making them difficult to image clearly. It might be impossible to differentiate two devices of the same model. A device held in a user's hand may be partially occluded, while a device kept in a purse or clothes pocket cannot be seen at all. Active markers such as an infrared Light Emitting Diode (LED) can assist in tracking and identification. For example, the controllers for next generation game consoles use infrared and visible LEDs to assist in tracking and associating the controllers with players. However, such active markers are rare, and require a line of sight; i.e., the camera must be able to view them.

The cross-modal sensor fusion technique is a sensor fusion approach to locating and tracking a mobile device and its user in video. The technique matches motion features measured by sensors on the device with image motion features extracted from images taken of the device. These motion features can be velocities or accelerations, for example. In one embodiment, the technique matches device acceleration with acceleration of the device observed in images (e.g., color and depth images) taken by a camera (such as a depth camera, for example). It uses the inertial sensors common to many mobile devices to find the device's acceleration in three dimensions. Device and image accelerations are compared in a 3D coordinate frame of the environment, thanks to the absolute orientation sensing capabilities common in today's smart phones, as well as the range sensing capability of depth cameras which enables computing the real world coordinates (meters) of image features.

A number of works explore the fusion of device sensors and visual features to find the user carrying the device. These rely on some external means of suggesting candidate objects in the video. For example, one example called ShakeID considers which of up to four tracked hands is holding the device. In the cross-modal sensor fusion technique described herein, rather than compare the motion of a small number of candidate objects in the video, fusion can be performed at every pixel in a video image and requires no separate process to suggest candidate objects to track. The cross-modal sensor technique requires no knowledge of the appearance of the device or the user, and allows for a wide range of camera placement options and applications. An interesting and powerful consequence of the technique is that the mobile device user, and in many cases the device itself, may be reliably tracked even if the device is in the user's pocket, fully out of view of the camera.

Tracking of a mobile device and its user can be useful in many real-world applications. For example, it can be used to provide navigation instructions to the user or it can be used to provide location-specific advertisements. It may also be used in physical security related applications. For example, it may be used to track objects of interest or people of interest. Many, many other applications are possible.

1.2 Sensor Fusion

"Sensor fusion" refers to the combination of multiple disparate sensors to obtain a more useful signal.

1.2.1 Device Association Using Sensor Fusion

There are some fusion techniques that seek to associate two devices by finding correlation among sensor values taken from both. For example, when two mobile devices are held together and shaken, accelerometer readings from both devices will be highly correlated. Detecting such correlation can cause application software to pair or connect the devices in some useful way. Similarly, when a unique event is observed to happen at the same time at both devices, various pairings may be established. Perhaps the simplest example is connecting two devices by pressing buttons on both devices simultaneously, but the same idea can be applied across a variety of sensors. For example, two devices that are physically bumped together will measure acceleration peaks at the same moment in time. These interactions are sometimes referred to as "synchronous gestures."

It can be particularly useful to establish correlations across very different modalities, since often such modalities complement each other. A few of these "cross-modal" approaches are mentioned below. For example, a mobile phone may be located and paired with an interactive surface by correlating an acceleration peak in the device with the appearance of a touch contact, or when the surface detects the visible flashing of a phone at the precise moment it is triggered. An object tagged with a Radio Frequency Identification (RFID) chip can be detected and located as it is placed on an interactive surface by correlating the appearance of a new surface contact with the appearance of a new RFID code.

1.2.2 Correlating Image and Device Motion

A small number of works have investigated the idea of correlating mobile device inertial sensor readings with movement observed in a video camera.

Some researchers have proposed correlating accelerometers worn at the waist with visual features to track young children in school. They consider tracking head-worn red LEDs, as well as tracking the position of motion blobs. For the accelerometer measurements, they consider integrating to obtain position for direct comparison with the visual tracking data, as well as deriving pedometer-like features. This research favors pedometer features in combination with markerless motion blob visual features.

Other researchers propose computing normalized cross correlation between the motion trajectory of an object and device accelerometer readings to determine which of several tracked objects contains the device. Their approach requires a window of many samples to perform correlation and relies on an external process to find and track objects from monocular video. Other researchers use a similar approach to synchronize inertial sensors and video cameras.

Still other researchers have proposed identifying and tracking people across multiple existing security cameras by correlating mobile device accelerometer and magnetometer readings. They describe a hidden Markov model-based approach to find the best assignment of sensed devices to tracked people. They rely on an external process to generate tracked objects and use a large matching window, though they demonstrate how their approach can recover from some common tracking failures.

One system, called the ShakeID system, matches smart phone accelerometer values with the acceleration of up to four hands tracked by a depth camera (e.g., Microsoft Corporation's Kinect® sensor). The hand holding the phone is inferred by matching the device acceleration with acceleration of hand positions over a short window of time (1 s). A Kalman filter is used to estimate the acceleration of each hand. The hand with the most similar pattern of acceleration is determined to be holding the device. This work further studies the correlation of contacts on a touch screen by the opposite hand. Ultimately touch contacts are associated with the held device by way of the Kinect® tracked skeleton that is seen to be holding the device.

All of the works discussed above that correlate device motion with motion in video require that a small number of candidate objects are first tracked. The subsequent correlation process involves determining which of these object's motion most closely matches that of the device. The step of generating candidate objects can be prone to failure. For example, ShakeID compares the motion of the tracked hands of the one or two users detected by the Kinect® sensor skeletal tracking process. If the device is not held in the hand, or if the Kinect® skeletal tracking fails, the device cannot be tracked. Furthermore, holding a mobile device can impact the hand tracking process to an extent that estimating hand acceleration robustly is difficult. Kinect® skeletal tracking requires a fronto-parallel view of the users. Thus relying on Kinect® skeletal tracking constraints where the camera may be placed. For example, skeletal tracking fails when the camera is mounted in the ceiling for an unobstructed top-down view of the room.

The cross-modal sensor fusion technique described herein avoids the difficulty of choosing candidate objects by matching low level motion features throughout the image. It may be used in many situations where skeletal tracking is noisy or fails outright and thus can be used in a wide variety of application scenarios. Whereas most of the above discussed work performs matching over a significant window in time, the cross-motion sensor fusion technique described herein uses a fully recursive formulation that relies on storing only the previous frame's results, not a buffer of motion history. In fact, the recursive nature of the computation allows it to be applied everywhere in the image in real time, avoiding the need to track discrete objects.

Arguably to correlate image and device motion for the purposes of locating the device or the user carrying it, the best approach is to match image motion directly, since as with "synchronous gestures" the pattern of image motion will provide the discriminative power to robustly detect the device or its user. Making fewer assumptions about the appearance of the device or user extends the range of applicability of the approach, and makes the technique less complex, more robust, and ultimately more useful.

1.2.3 Exemplary Processes for Practicing the Technique

The following paragraphs described various exemplary processes for practicing the cross-modal sensor fusion technique. In general, the technique matches motion features measured on a mobile device with motion features observed in images of the device in order to track the device (and its user). Some embodiments of the technique use color and depth images as described in the following paragraphs, but it is possible to practice the technique using grayscale and/or just two dimensional images.

In one embodiment of the technique, the matching process is performed at a predetermined number of pixels selected from various locations in a color image. The pixels used for matching can be selected based on a variety of distributions in the image. In one embodiment, the matching process is performed at each pixel in a color image. By virtue of the absolute orientation sensing available on a mobile device such as, for example, a smart phone, and the ability to determine the 3D position of an observed point in the color image taken by a depth camera, the match is performed in a common 3D coordinate frame.

FIG. 1 depicts one exemplary process 100 for practicing the cross-modal sensor fusion technique. As shown in block 102, motion features of a mobile device are measured by sensors on the device and images of the device and any object to which it is rigidly attached are simultaneously captured.

Image motion features of the device in the captured images are found (block 104). For example, the image motion features can be either velocities or accelerations which are determined on a pixel by pixel basis at various locations in an image. The image motion features are converted into the same coordinate frame of the mobile device, as shown in block 106.

Device motion features measured on the device are then matched with the image motion features of the device, as shown in block 108. For example, the device motion features can be velocities or accelerations measured by sensors on the device. The difference between the image motion features and the device motion features is computed at on a per pixel basis, at a number of pixel locations in one or more of the captured images in the common (possibly real-world) coordinate system, as shown in block 110. This number of pixels can be, for example, every pixel in an image, every other pixel in an image, a random distribution of pixels in the image, a uniform distribution of pixels and the like. Furthermore, the number of pixels can be predetermined if desired, as can the pixel locations that are selected. In one embodiment of the technique the real world coordinates of the device's motions are provided by the sensors on the device, while the real world coordinates of the image motion features are determined using the coordinates from the camera that captured the images.

The presence of the device and the object rigidly attached to it are then determined using the difference at the chosen pixels, as shown in block 112. The smallest difference in an image determines the device location (and any rigid object attached to it, such as the user of the device) in the common (e.g., real-world) coordinate system.

Figure 2:
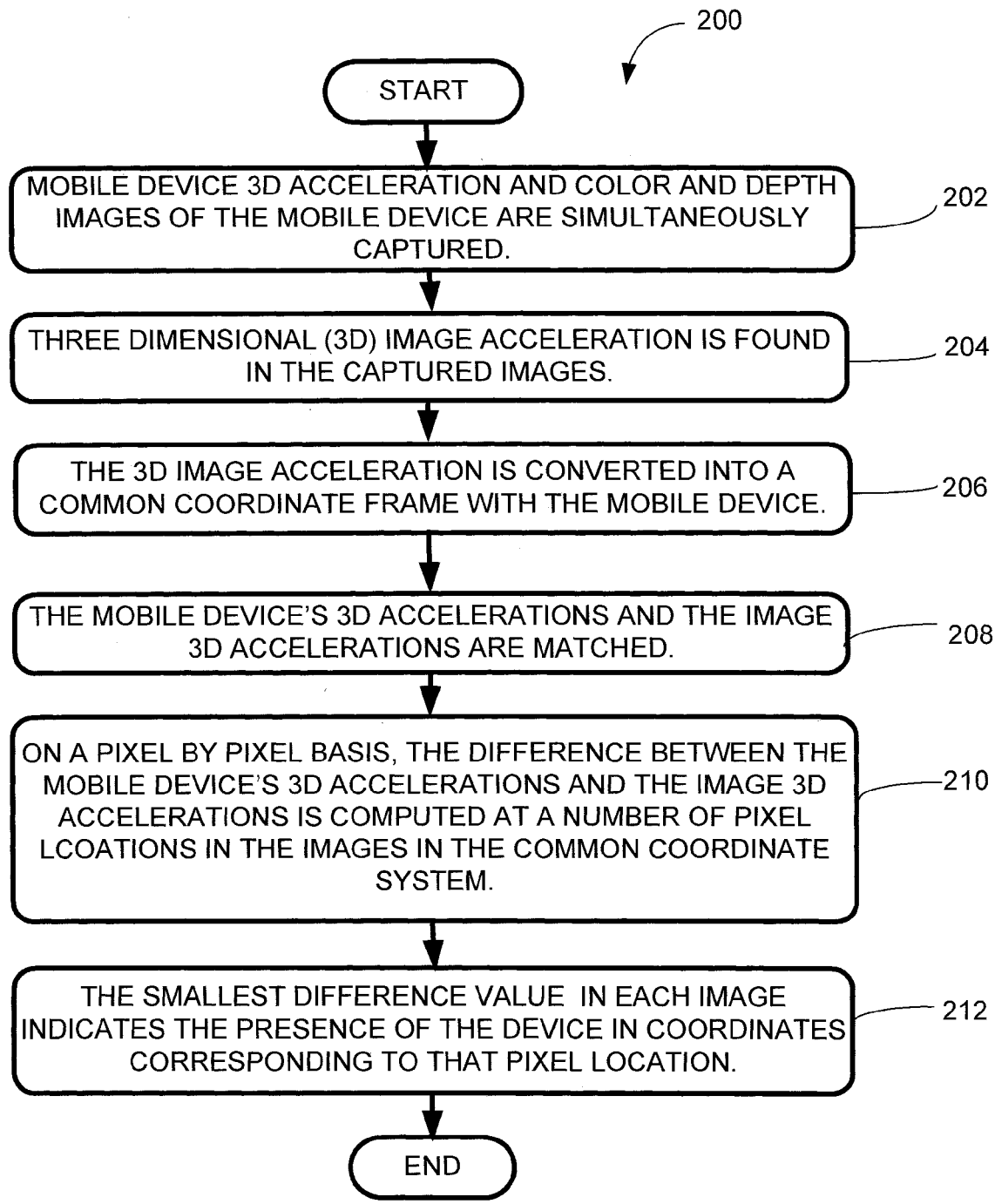
FIG. 2 depicts a flow diagram of a process for practicing another exemplary embodiment of the cross-modal sensor fusion technique described herein.

FIG. 2 depicts another exemplary process 200 for practicing the cross-modal sensor fusion technique that matches motion features that are accelerations. As shown in block 202, mobile device acceleration and color and depth images of the mobile device and its user are simultaneously captured.

Three-dimensional (3D) image accelerations are found in the captured images, as shown in block 204. These can be found, for example, by computing a 2D optical flow on the captured color images and using corresponding depth images to compute the 3D acceleration. These 3D image accelerations are then converted into the same coordinate frame of the mobile device, as shown in block 206.

The device accelerations measured by sensors on the device and the image accelerations are then matched, as shown in block 208. The difference between image and device acceleration is computed on a per pixel basis, at a number of pixel locations in the color images, as shown in block 210. The smallest difference value indicates the presence of the device at that pixel or point, as shown in block 212.

Figure 3:
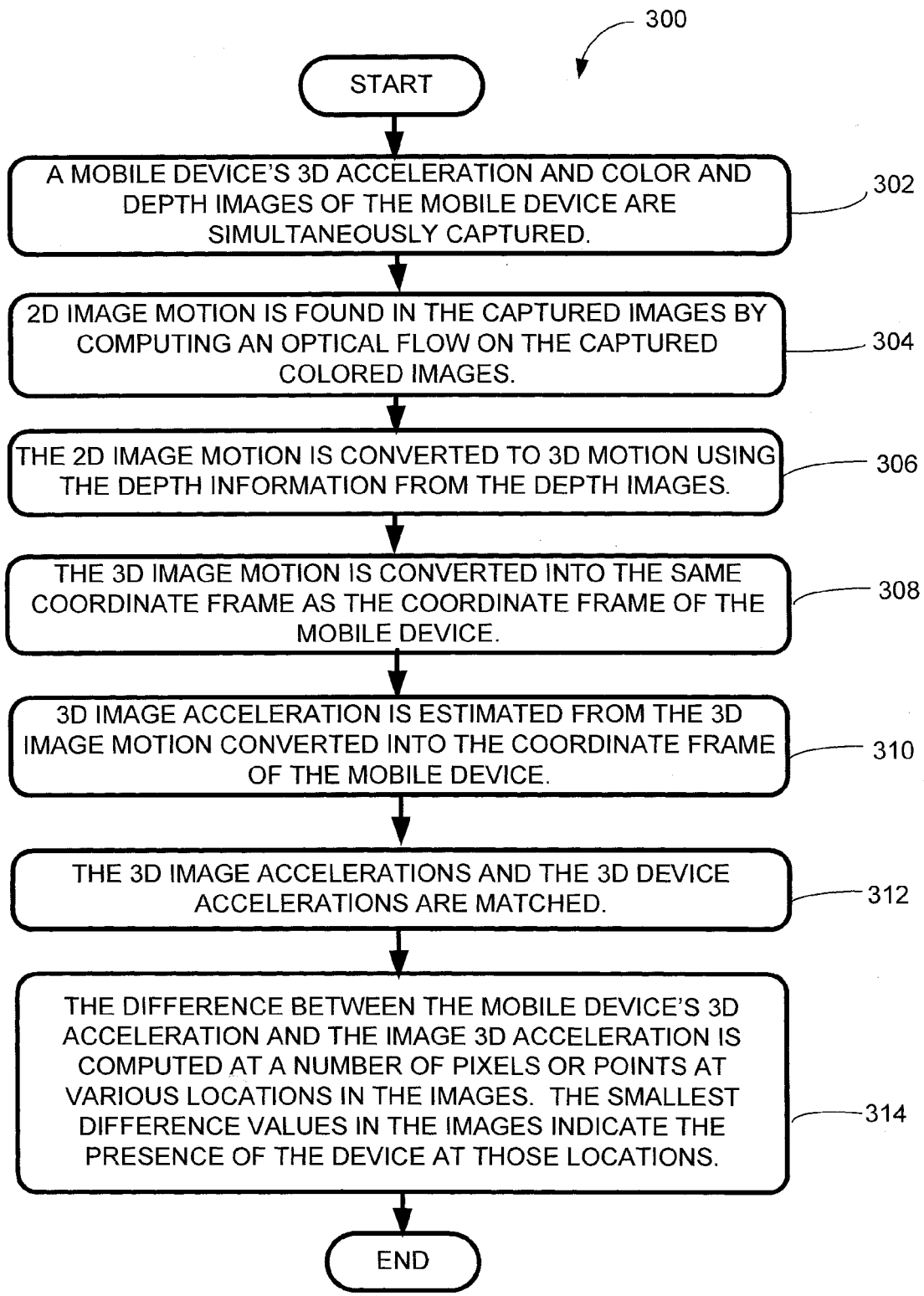
FIG. 3 depicts a flow diagram of a process for practicing yet another exemplary embodiment of the cross-modal sensor fusion technique described herein.

FIG. 3 depicts yet another exemplary process 300 for practicing the cross-modal sensor fusion technique. As shown in block 302, mobile device acceleration is found. Simultaneously with the capture of the mobile device's acceleration, color depth images of the mobile device, and optionally its user, are captured.

Two-dimensional (2D) image motion is found in the captured images, as shown in block 304, by simultaneously computing a dense optical flow of flow vectors on the captured color images. Each flow vector is converted to a 3D motion using the depth images, as shown in block 306, and each flow vector is transformed to the coordinate frame of the mobile device, as shown in block 308. Image acceleration is estimated, as shown in block 310. This 3D acceleration is estimated by a Kalman filter at each point of the image, with the 3D flow at the point provided as input.

The 3D device and image accelerations are then matched, as shown in block 312. The difference between image and device acceleration is computed at a number of pixels or points throughout one or more in the color images. The number of pixel or point locations can be predetermined if desired, as can the pixel or point locations that are selected. The smallest difference value in each image indicates the presence of the device at those pixel or point locations, as shown in block 314.

The above-described exemplary processes for practicing the cross-modal sensor fusion technique provide a general description of these processes. Section 2 of this specification provides specific details of the computations performed in each of the actions performed in the processes.

Several exemplary processes for practicing the cross-modal sensor fusion technique having been described, the next section describe an exemplary system that can be used for practicing the technique.

1.2.4 An Exemplary System for Practicing the Technique

Figure 4:
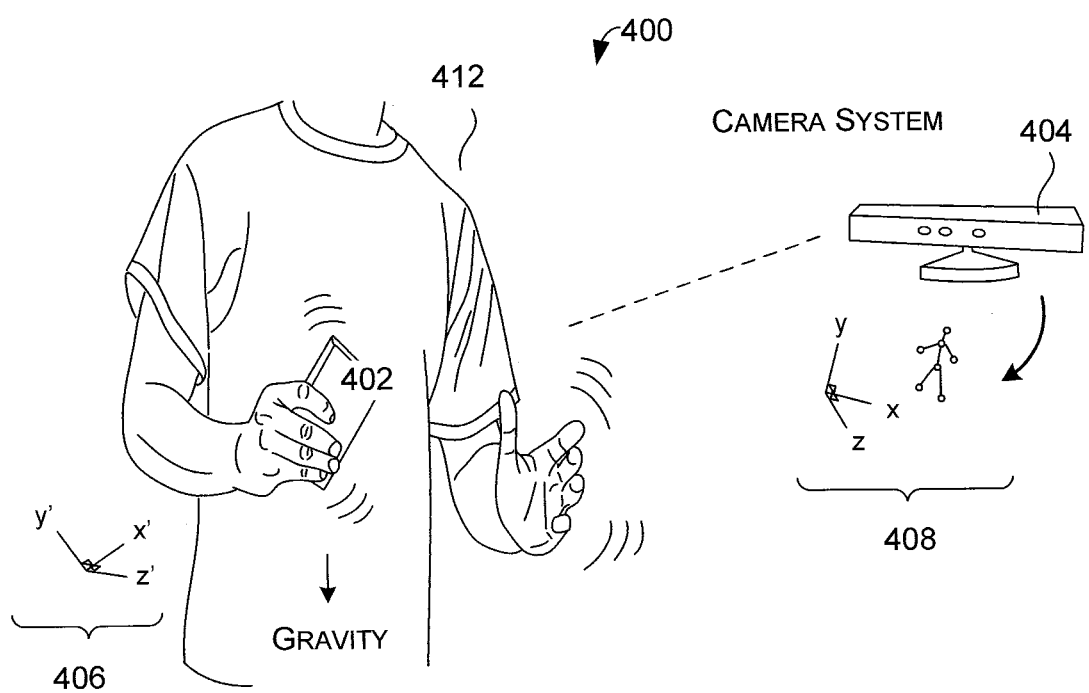
FIG. 4 shows one exemplary environment for using a system which correlates motion features obtained from a mobile device and motion features obtained from images of the device in order to track the device according to the cross-modal sensor fusion technique described herein.

FIG. 4 shows an illustrative environment 400 which serves as a vehicle for introducing a system for practicing the cross-modal sensor fusion technique described herein. The system receives motion information from a mobile device 402. More specifically, the system receives device motion features measured by sensors on at least one mobile device 402. The system further receives captured images of the mobile device 402, from which image motion features are computed, from at least one external camera system 404. The device motion features from the mobile device are generated by the mobile device 402 itself, with respect to a frame of reference 406 of the mobile device 402. The captured images are captured by the external camera system 404 from a frame of reference 408 that is external to the mobile device 402. In other words, the external camera system 404 observes the mobile device 402 from a vantage point that is external to the mobile device 402.

Generally speaking, the mobile device 402 is associated with at least one object. That object can be, for example, a user 412 which moves within a scene. For example, the mobile device 402 comprises a handheld unit that is rigidly attached to a user 412. Any of the parts of an object (e.g., a user) 412 may be in motion at any given time.

As will be explained in detail below, one purpose of the system is to track the object (for example, the user 412) that is associated with the mobile device 402. For example, in FIG. 4, the system seeks to track the user 412 that is holding the mobile device 402. The system performs this task by correlating the device motion features obtained from mobile device 402 with the image motion features of the mobile device 402 obtained from the captured images. For example, the system matches the device motion features from the mobile device (which are generated by sensors on the mobile device 402) with image motion features extracted from the captured images. The system then computes the difference between the motion features from the mobile device (which are generated by the mobile device 402) and the motion features extracted from the captured images. In one embodiment of the system the difference is computed on a pixel by pixel basis for a predetermined number of pixels at various locations in an image. The smallest difference is determined as the location of the mobile device 402 (with the user 412 rigidly attached thereto). The system can then use this conclusion to perform any environment-specific actions.

The system can be applied to many other scenarios. For example, in FIG. 4, the mobile device 402 corresponds to a piece of equipment that the user grasps and manipulates with a hand. For example, this type of equipment may comprise a pointing device, a mobile telephone device, a game controller device, a game implement (such as a paddle or racket) and so on. But, more generally, the mobile device 402 can correspond to any piece of equipment of any size and shape and functionality that can monitor its own movement and report that movement to the system. For example, in other environments, the mobile device 402 may correspond to any piece of equipment that is worn by the user 412 or otherwise detachably fixed to the user. For example, the mobile device 402 can be integrated with (or otherwise associated with) a wristwatch, pair of paints, dress, shirt, shoe, hat, belt, wristband, sweatband, patch, button, pin, necklace, ring, bracelet, eyeglasses, goggles, and so on.

In other cases, a scene contains two or more subjects, such as two or more users (not shown in FIG. 4). Each user may hold (or wear) his or her own mobile device. In this context, the system can determine the association between mobile devices and respective users. In the case of more than one mobile device, the matching process is run for each device. However, image motion estimation, which is a computationally expensive computation, needs to be run only once regardless of how many devices are matched.

In yet other cases, the object that is associated with the mobile device 402 is actually a part of the mobile device 402 itself. For example, the object may correspond to the housing of a mobile phone, the paddle of a game implement, etc. Still further interpretations of the terms "mobile device" and "object" are possible. However, to facilitate explanation, most of the examples which follow will assume that the object corresponds the user 412 which holds or is otherwise associated with the mobile device 402.

Figure 5:
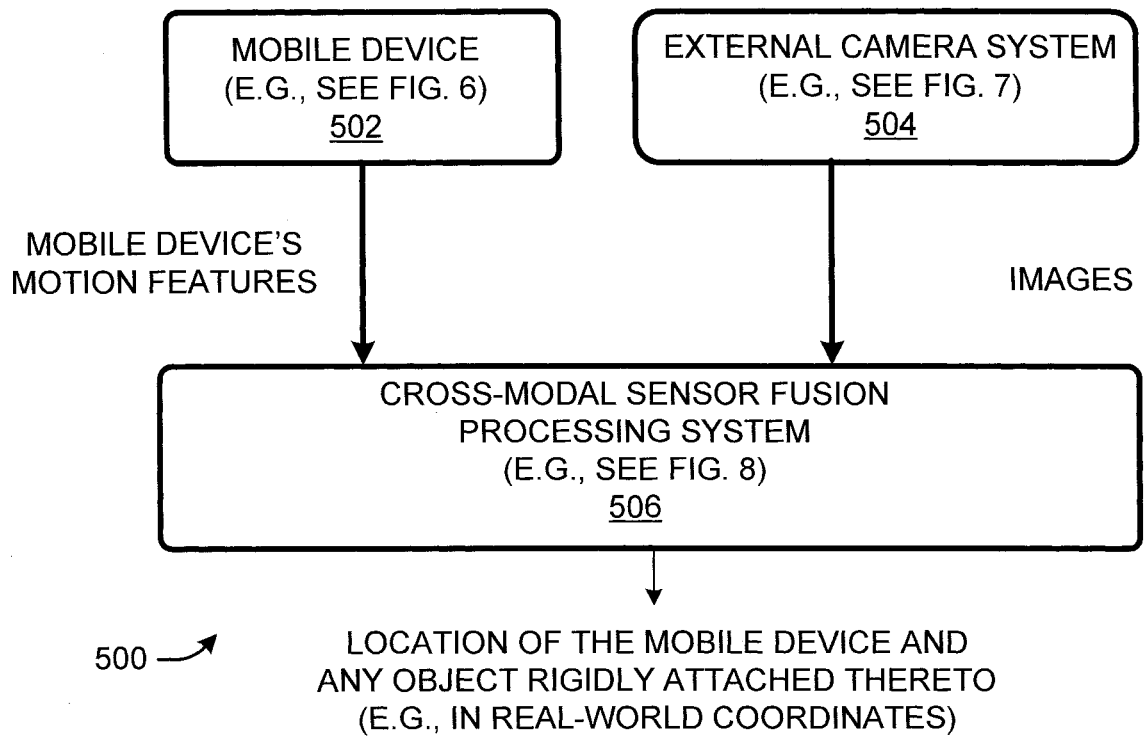
FIG. 5 shows a high-level depiction of an exemplary cross-modal sensor fusion system that can be used in the exemplary environment shown in FIG. 4.

FIG. 5 shows a high-level block depiction of a system 500 that performs the functions summarized above. The system 500 includes a mobile device 502, an external camera system 504, and a cross-modal sensor fusion processing system 506. The mobile device 502 supplies device motion features measured on the mobile device to the cross-modal sensor fusion processing system 506. The external camera system 504 captures images of the device 502 and sends these to the cross-modal sensor fusion processing system 506. The cross-modal sensor fusion processing system 506 computes the image motion features. It also performs a correlation analysis of the motion features measured on the mobile device and the image motion features obtained from the captured images at various locations in the images. Using a pixel by pixel analysis at a number of pixel locations in an image, the cross-modal sensor fusion processing system 506 computes the difference between the device motion features measured on the mobile device and the image motion features obtained from the captured image at these pixel locations and the smallest difference indicates the location of the mobile device (and therefore the user attached thereto) in that image.

Figure 6:
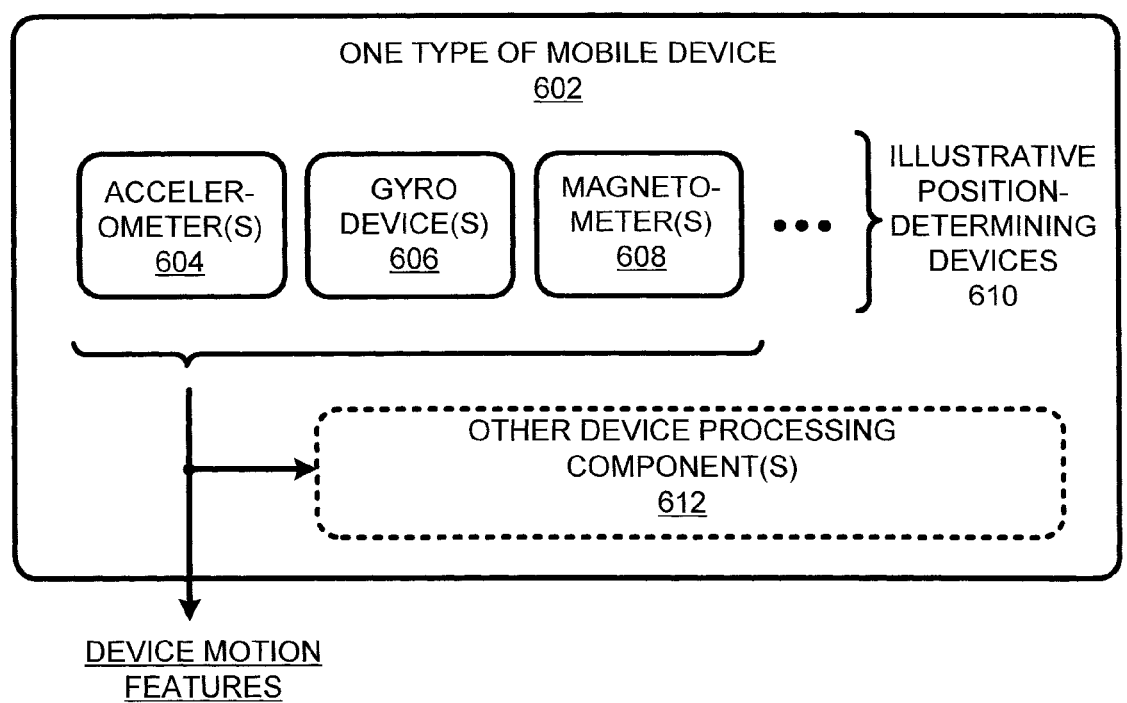
FIG. 6 shows an illustrative mobile device for use in the system of FIG. 5.

FIG. 6 shows an overview of one type of mobile device 602. The mobile device 602 incorporates or is otherwise associated with one or more position-determining devices 610. For example, the mobile device 602 can include one or more accelerometers 604, one or more gyro devices 606, one or more magnetometers 608, one or more GPS units (not shown), one or more dead reckoning units (not shown), and so on. Each of the position-determining devices 610 uses a different technique to detect movement of the device, and, as a result, to provide a part of the motion features measured on the mobile device 602.

The mobile device 602 may include one or more other device processing components 612 which make use of the mobile device's motion features for any environment-specific purpose (unrelated to the motion analysis functionality described herein). The mobile device 602 also sends the mobile device's motion features to one or more destinations, such as the cross-modal sensor fusion processing system (506 of FIG. 5). The mobile device 602 can also send the mobile device's motion features to any other target system, such as a game system.

Figure 7:
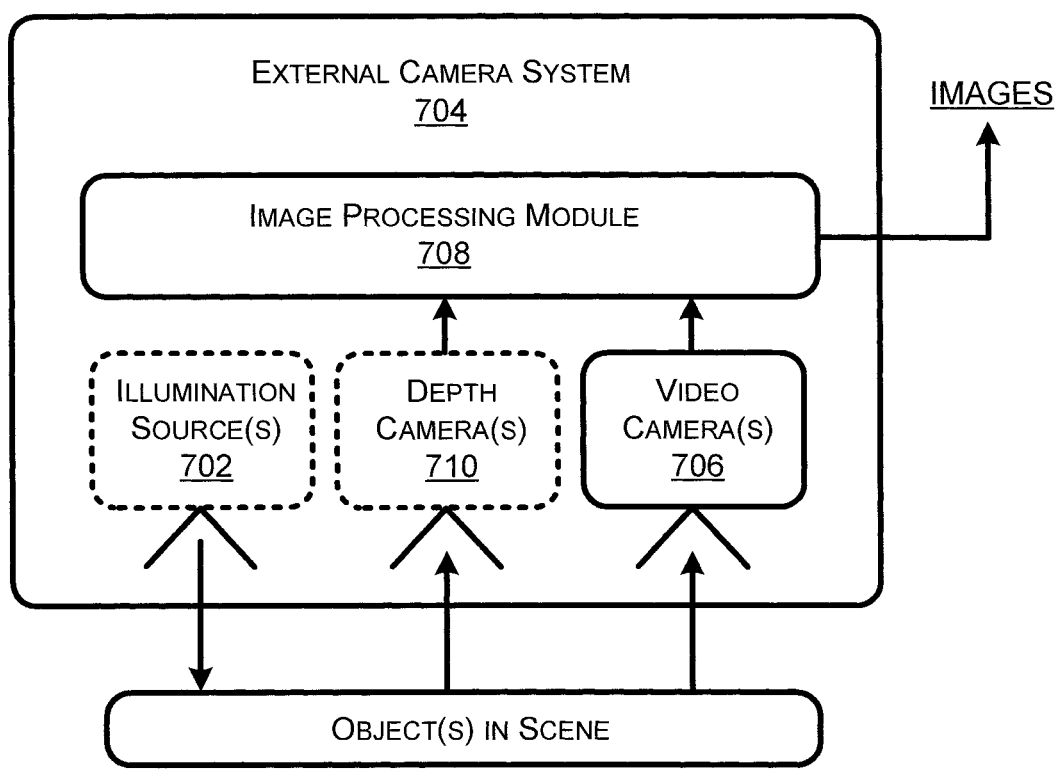
FIG. 7 shows an illustrative external camera system for use in the system of FIG. 5.

FIG. 7 shows an overview of one type of external camera system 704. In general, the external camera system 704 can use one or more data capture techniques to capture a scene which contains the mobile device and an object, such as the user. For example, the external camera system 704 can investigate the scene by irradiating it using any kind electromagnetic radiation, including one or more of visible light, infrared light, radio waves, etc.

The external camera system 704 can optionally include an illumination source 702 which bathes the scene in infrared light. For example, the infrared light may correspond to structured light which provides a pattern of elements (e.g., dots, lines, etc.). The structured light deforms as it is cast over the surfaces of the objects in the scene. A depth camera 710 can capture the manner in which the structured light is deformed. Based on that information, the depth camera 710 can derive the distances between different parts of the scene and the external camera system 704. The depth camera 710 can alternatively, or in addition, use other techniques to generate the depth image, such as a time-of-flight technique, a stereoscopic correspondence technique, etc.

The external camera system 704 can alternatively, or in addition, capture other images of the scene. For example, a video camera 706 can capture an RGB video image of the scene or a grayscale video image of the scene.

An image processing module 708 can process the depth images provided by the depth camera 704 and/or one or more other images of the scene provided by other capture units.

The Kinect® controller provided by Microsoft Corporation of Redmond, Wash., can be used to implement at least parts of the external camera system.

As discussed above, the external camera system 704 can capture a video image of the scene. The external camera system 704 send the video images to the cross-modal sensor fusion system 806, described in greater detail with respect to FIG. 8.

Figure 8:
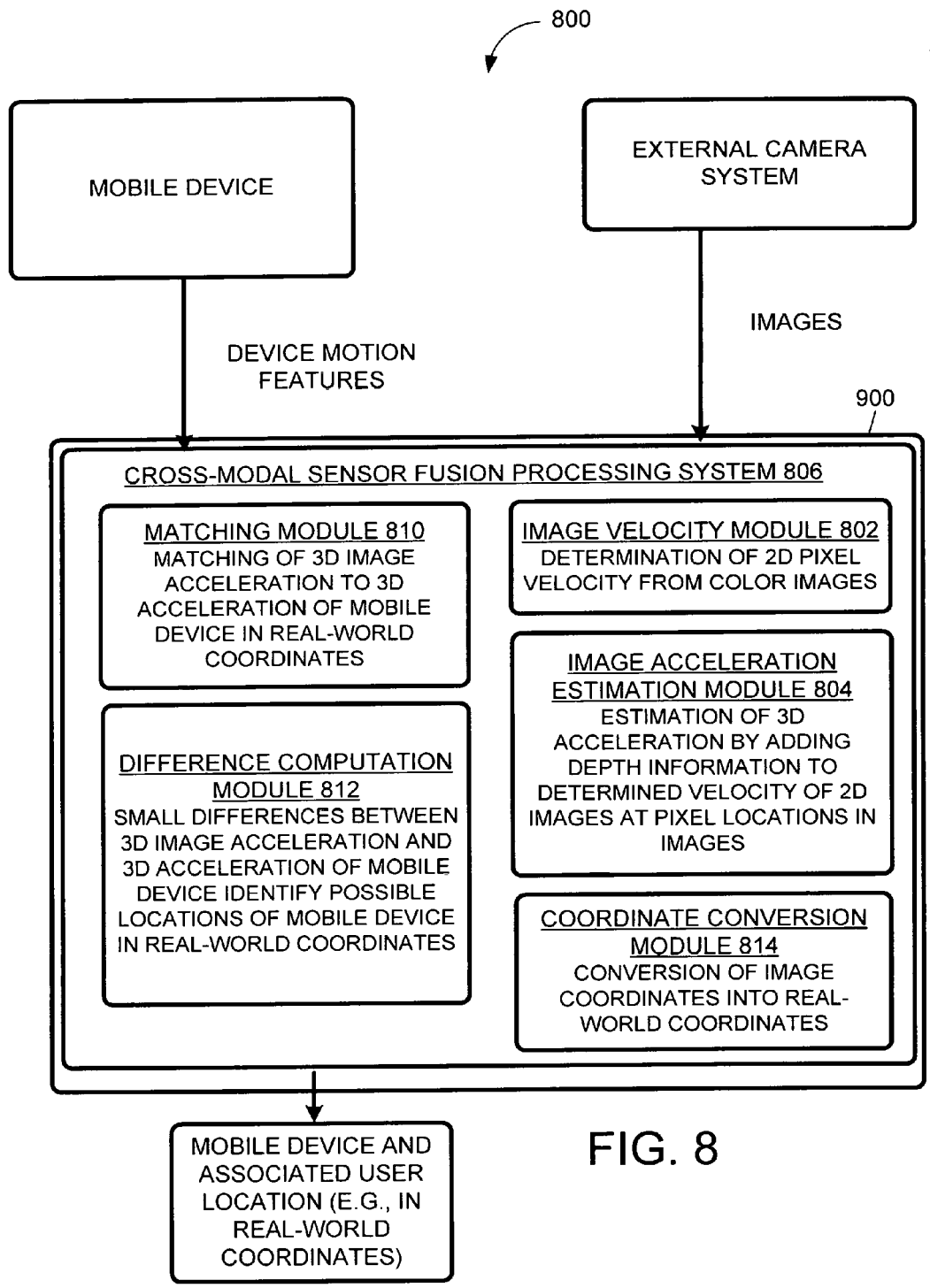
FIG. 8 shows an illustrative cross-modal sensor fusion system that can be used in conjunction with the external camera system of FIG. 7.
Figure 9:
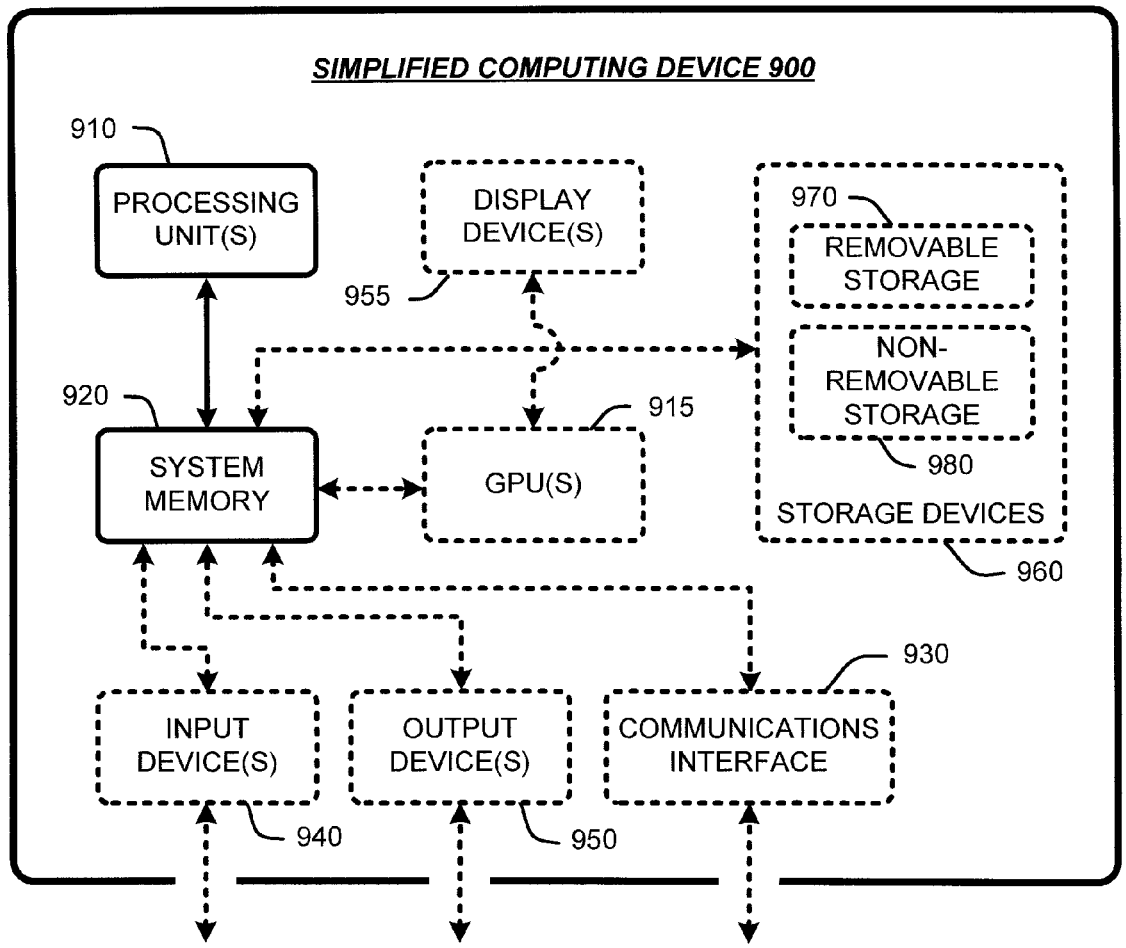
FIG. 9 is a schematic of an exemplary computing environment which can be used to practice the cross-modal sensor fusion technique.

As shown in FIG. 8, one embodiment 800 of the cross-modal sensor fusion processing system 806 resides on computing device 900 that is described in greater detail with respect to FIG. 9. The cross-modal sensor fusion processing system 806 receives device motion features measured onboard of a mobile device and images captured by the external camera system previously discussed. The image motion features are computed by the cross-modal sensor fusion processing system 806. The device motion features can be velocities or 3D accelerations reported by sensors on the mobile device. The motion features of the mobile device and the captured images can be transmitted to the cross-modal sensor fusion system 806 via a communications link, such as, for example, a WiFi link or other communications link.

The system 806 includes a velocity determination module 808 that determines the 2D velocity of the image features. The system 806 also includes an image acceleration estimation module that estimates 3D image accelerations by adding depth information to the 2D image velocities. A conversion module 814 converts the image coordinates into a common (e.g., real-world) coordinate frame used by the mobile device.

The system 806 also includes a matching module 810 that matches the device motion features and the image motion features (e.g. that matches the image velocities to the device velocities, or that matches the image accelerations to the device accelerations, depending what type of motion features are being used). A difference computation module 812 computes the differences between the device motion features and the image motion features (e.g., 3D device accelerations and the 3D image accelerations) at points in the captured images. The difference computation module 812 determines the location of the mobile device as the point in each image where the difference is the smallest.

The above-described exemplary system for practicing the cross-modal sensor fusion technique provides a general description of a system that can be used for practicing the technique. Section 2 of this specification provides specific details of the computations performed in each of the components of the system.

2.0 Details of the Processes and System for Practicing the Cross-Modal Sensor Fusion Technique In the following sections details for the computations of the processes and system components of the cross-modal sensor fusion technique depicted in FIGS. 1 through 8 are described in greater detail.

2.1 Device Motion

Many mobile device APIs offer real-time device orientation information. In many devices orientation is computed by combining information from the onboard accelerometers, gyroscopes and magnetometers. Because this orientation is with respect to magnetic north (as measured by the magnetometer) and gravity (as measured by the accelerometer, when the device is not moving), it is often considered an "absolute" orientation. In some embodiments of the cross-modal sensor fusion technique, the mobile device reports orientation to a standard "ENU" (east, north, up) coordinate system. While magnetic north is disturbed by the presence of metal and other magnetic fields present in indoor environments, in practice it tends to be constant in a given room. It is only important that magnetic north not change dramatically as the device moves about the area imaged by the depth camera (e.g., Kinect® sensor).

Mobile device accelerometers report device acceleration in the 3D coordinate frame of the device. Having computed absolute orientation using the magnetometers, gyros and accelerometers, it is easy to transform the accelerometer outputs to the ENU coordinate frame and subtract acceleration due to gravity. Some mobile devices provide an API that performs this calculation to give the acceleration of the device in the ENU coordinate frame, without acceleration due to gravity. Of course, because it depends on device orientation, its accuracy is only as good as that of the orientation estimate. One mobile device in a prototype implementation transmits this device acceleration (ENU coordinates, gravity removed) over WiFi to the cross-modal sensor fusion system that performs sensor fusion.

2.2 Image Motion

As discussed above with respect to FIGS. 1-3 and 5-8, the cross-modal sensor fusion technique compares image motion features from images of the device and device motion features from sensors on the device in order to track the device (and its user). In some embodiments of the technique, only velocities are computed. In other embodiments, accelerations are also computed. The following discussion focuses more on using accelerations in tracking the mobile device. The processing used in using velocities to track the mobile device is basically a subset of that for using accelerations. For example, estimating velocity from images is already accomplished by computing optical flow. Computing like velocities on the mobile device involves integrating the accelerometer values from the device.

In one embodiment of the technique, the cross-modal sensor fusion technique compares the 3D acceleration of the mobile device with 3D acceleration observed in video. The technique finds acceleration in video by first computing the velocity of movement all of the pixels in a color image using a standard optical flow technique. This 2D image-space velocity is augmented with depth information and converted to velocity in real world 3D coordinates (meters per second). Acceleration is estimated at each point in the image using a Kalman filter. The following paragraphs describe each of these steps in detail.

2.2.1 Finding 2D Velocity with Optical Flow

Rather than tracking the position of a discrete set of known objects in the scene, image motion is found by computing a dense optical flow on an entire color image. Dense optical flow algorithms model the motion observed in a pair of images as a displacement u, v at each pixel. There are a variety of optical flow algorithms. One implementation of the technique uses an optical flow algorithm known for its accuracy that performs a nonlinear optimization over multiple factors. However, there are many other ways to compute flow, including a conceptually simpler block matching technique, where for each point in the image at time t, the closest patch around the point is found in the neighborhood of the point at time t+1, using the sum of the squared differences on image pixel intensities, or other similarity metrics. While optical flow is typically used to compute the motion forward from time t−1 to the frame at time t, for reasons explained later the cross-modal sensor fusion technique computes flow from the current frame at time t to the frame at time t−1. The velocity u, v at each point x, y is denoted as $u_{x,y}$ and $v_{x,y}$. It is noted that x, y are integer valued, while u, v are real-valued.

2.2.2 Converting to 3D Motion

Depth cameras, such as for example Microsoft Corporation's Kinect® sensor, report distance to the nearest surface at every point in its depth image. Knowing the focal lengths of the depth and color cameras, and their relative position and orientation, the 3D position of a point in the color image may be calculated. One known external camera system provides an API to compute the 3D position of a point in the color camera in real world units (meters). The 3D position corresponding to a 2D point x, y in the color image at time t is denoted as $z_{x,y,t}$.

Rather than converting 2D velocities (as computed by optical flow) to 3D quantities directly, one embodiment of the cross-modal sensor fusion technique uses a Kalman filter-based technique that estimates velocity and acceleration at each pixel.

2.2.3 Estimating Acceleration

Some embodiments of the cross-modal sensor fusion technique uses a Kalman filter to estimate acceleration of moving objects in the image. The Kalman filter incorporates knowledge of sensor noise and is recursive (that is, it incorporates all previous observations). The technique thus allows much better estimates of acceleration compared to the approach of using finite differences. The basics of estimating acceleration employed in one embodiment of the cross-modal sensor fusion technique are described below.

The Kalman filter is closely related to the simpler "exponential" filter. The exponential filter computes a smoothed estimate of a scalar $z_t$ using the recursive relation:

$$x_t = x_{t-1} + \alpha(z_t - x_{t-1})$$

where the gain $\alpha \epsilon (0,1)$ controls the degree to which the filter incorporates the "innovation" $z_t - x_{t-1}$. The smaller the gain, the less the filter follows the observation $z_t$, and the more the signal is smoothed. An improved version of this filter is $$x_t = x_{t-1} + \alpha(z_t - x_t^*)$$

where $x_t^*$ is a prediction of $x_t$ given $x_{t-1}$. The Kalman filter is essentially this improved exponential filter, and includes a principled means to set the value of the gain given the uncertainty in both the prediction $x_t^*$ and observation $z_t$.

For the problem of estimating acceleration from image motion, the motion of a single object in 3D is first considered. The equations of motion predict the object's position $x_t^*$, velocity $v_t^*$ and acceleration $a_t^*$ from previous values, $x_{t-1}$, $v_{t-1}$ and $a_{t-1}$:

$$x_t^* = x_{t-1} + v_{t-1}\Delta t + \tfrac{1}{2} a_{t-1}\Delta t^2$$

$$v_t^* = v_{t-1} + a_{t-1}\Delta t$$

$$a_t^* = a_{t-1}$$

Given observation $z_t$ of the position of a tracked object, the technique updates the estimates of position, velocity and acceleration with $$x_t = x_{t-1} + k_x * (z_t - x_t^*)$$

$$v_t = v_{t-1} + k_v * (z_t - x_t^*)$$

$$a_t = a_{t-1} + k_a * (z_t - x_t^*)$$

where * denotes element-wise multiplication, and Kalman gains $k_x$, $k_v$, $k_a$ relate the innovation, or error in the prediction of position, to changes in each of the estimates of position, velocity and acceleration. Kalman gain is computed via a conventional method for computing the optimal Kalman gain using two distinct phases of prediction and update. The predict phase uses the state estimate from a previous time step to produce an estimate of the state at the current time step. This predicted state estimate, or a priori state estimate, is an estimate of the state at the current time step, but does not include observation information from the current time step. In the update phase, the current a priori prediction is combined with current observation information to refine the state estimate (called the a posteriori state estimate). Typically, the two phases alternate, with the prediction advancing the state until the next observation, and the update incorporating the observation, but this is not necessary. Hence, the Kalman gain is a function of the uncertainty in the predictive model $x_t^*$ and observations z. In particular, it is preferable to assign a high uncertainty to the estimate of acceleration $a_t$ to reflect the belief that acceleration of the object varies over time. Similarly, the uncertainty in $z_t$ is related to the noise of the sensor.

Finally, it is noted that the usual formulation of Kalman gain is time-varying. However, if the uncertainty of the predictive model and observations is constant, Kalman gain converges to a constant value, as presented above. This leads to a simplified implementation of the update equations, and further underscores the relationship between the Kalman filter and the simpler exponential filter.

2.2.4 Incorporating Flow

The cross-modal sensor fusion technique maintains a Kalman filter of the form described above to estimate 3D acceleration at pixel locations in the image (in some embodiments at each pixel). The estimated position, velocity and acceleration at each pixel location x, y are denoted as $x_{x,y,t}$, $v_{x,y,t}$ and $a_{x,y,t}$ respectively.

Optical flow information is used in two ways: first, the flow at a point in the image is a measurement of the velocity of the object under that point. It thus acts as input to estimate of acceleration using the Kalman filter. Second, the technique can use flow to propagate motion estimates spatially, so that they track the patches of the image whose motion is being estimated. In this way the Kalman filter can use many observations to accurately estimate the acceleration of a given patch of an object as it moves about the image. This is accomplished in the following manner:

The Kalman update equations are elaborated to indicate that there is a separate instance of the filter at each pixel, and to incorporate flow $u_{x,y}$ and $v_{x,y}$ (which is abbreviated as u and v):

$$x_{x,y,t} = x_{x+u,y+v,t-1} + k_x^*(z_{x,y,t} - x^*_{x,y,t})$$

$$v_{x,y,t} = v_{x+u,y+v,t-1} + k_v^*(z_{x,y,t} - x^*_{x,y,t})$$

$$a_{x,y,t} = a_{x+u,y+v,t-1} + k_a^*(z_{x,y,t} - x^*_{x,y,t})$$

It should be noted that x, y are integer-valued, while u, v are real-valued. In practice, $x_{x,y,t-1}$, $v_{x,y,t-1}$ and $a_{x,y,t-1}$ are stored as an array the same dimension of the color image, but because x+u and y+v are real valued, quantities $x_{x+u,y+v,t-1}$, $v_{x+u,y+v,t-1}$, and $a_{x+u,y+v,t-1}$ are best computed by bilinear interpolation. In this process, the Kalman filter at x, y updates motion estimates found at x+u, y+v in the previous time step. In this way motion estimates track the objects whose motion is being estimated.

This interpolation motivates computing optical flow in reverse fashion, from time t to time t−1: $u_{x,y}$ and $v_{x,y}$ are defined for all integer values x, y. Computing flow in the usual fashion from time t−1 to time t might leave some pixels without "predecessors" from the previous frame, even if previous motion estimates are distributed across multiple pixels using bilinear interpolation. Computing flow from time t to time t−1 avoids this problem.

2.3 Sensor Fusion

The following paragraphs describe the sensor fusion computations employed in some embodiments of the technique.

2.3.1 Common Coordinate System

In the following, a one-time calibration procedure which obtains the camera's orientation with respect to the ENU coordinate frame of the mobile device is described. Motion observed in the camera may then be transformed to ENU coordinates and compared to device accelerations directly.

While there are many ways to compute the relative orientation of the depth camera to the coordinate system used by the mobile device, a straightforward semi-automatic procedure that is easy to implement and gives good results is adopted in one embodiment of the technique. First the mobile device is placed display-side down on a plane that is easily observed by the camera, such as a wall or desk. Viewing the color video stream of the camera, the user clicks on three or more points on the plane.

The 3D unit normal $n_k$ of the plane in coordinates of the camera is computed by first calculating the 3D position of each clicked point and fitting a plane by a least-squares procedure. The same normal $n_w$ in ENU coordinates is computed by rotating the unit vector z (out of the display of the device) by the device orientation. Similarly, gravity unit vector $g_k$ in camera coordinates is taken from the 3-axis accelerometer built in to some camera system, such as, for example, the Kinect® sensor. Gravity $g_w$ in the ENU coordinate frame is by definition −z.

The 3×3 rotation matrix $M_{camera \rightarrow world}$ that brings a 3D camera point to the ENU coordinate frame is calculated by matching the normals $n_k$ and $n_w$, as well as gravity vectors $g_k$ and $g_w$, and forming orthonormal bases K and W by successive cross products:

$$k_1 =, k_2 = \frac{n_k \times g_k}{\|n_k \times g_k\|}, k_3 = n_k \times k_2, K = \begin{bmatrix} k_1 \\ k_2 \\ k_3 \end{bmatrix}$$

$$w_1 = n_w, w_2 = \frac{n_w \times g_w}{\|n_w \times g_w\|}, w_3 = n_w \times w_2, W = \begin{bmatrix} w_1 \\ w_2 \\ w_3 \end{bmatrix}$$

$$M_{camera \rightarrow world} = K^{-1} W$$

2.3.2 Matching

In one embodiment of the cross-modal sensor fusion technique, 3D image accelerations are estimated at each pixel and transformed to the ENU coordinate system as described above. The acceleration observed at each pixel may be compared directly to the device acceleration $d_t$:

$$r_{x,y,t} = \sqrt{\|a_{x,y,t} - d_t\|^2}$$

Regions of the image that move with the device will give small values of $r_{x,y,t}$. In particular, the hope is that pixels that lie on the device will give the smallest values. If one assumes that the device is present in the scene, it may suffice to locate its position in the image by finding x*, y* that minimizes $r_{x,y,t}$. However, other objects that momentarily move with the device, such as those rigidly attached (e.g., the hand holding the device and the arm) may also match well.

In practice, in some embodiments of the technique locating the device by computing the instantaneous minimum over $r_{x,y,t}$ will fail to find the device when it is momentarily still or moving with constant velocity. In these cases device acceleration may be near zero and so matches many parts of the scene that are not moving, such as the background. This is addressed by smoothing $r_{x,y,t}$ with an exponential filter to obtain $s_{x,y,t}$. This smoothed value is "tracked" using optical flow and bilinear interpolation, in the same manner as the Kalman motion estimates. Small values over the smoothed value $s_{x,y,t}$ will pick out objects that match device acceleration over the recent past (depending on smoothing parameter α) and "remember" the moments when some non-zero device acceleration uniquely identified it in the image. In the case where the device stops moving, the small values $s_{x,y,t}$ will stay with the device for some time, hopefully until the device moves again.

An important consideration in performing the above matching process is that the latency of the depth camera (e.g., the Kinect® sensor) is much greater than that of the mobile device, including WiFi communications. Without accounting for this difference, the measure of similarity, may be inaccurate. In one embodiment, the cross-modal sensor fusion technique accounts for the relative latency of the camera (e.g., Kinect® sensor) by artificially lagging the mobile device readings by some small number of frames. In one prototype implementation this lag is tuned empirically to four frames, approximately 64 ms.

In some applications it may not be appropriate to assume that the device is in the scene. For example, the user holding the device may leave the field of view of the camera. In this case the minimum value over $s_{x,y,t}$ can be checked against a threshold to reject matches of poor quality. The minimum value at x*, y* is denoted as s*.

3.0 Exemplary Operating Environment:

The cross-modal sensor fusion technique described herein is operational within numerous types of general purpose or special purpose computing system environments or configurations. FIG. 9 illustrates a simplified example of a general-purpose computer system on which various embodiments and elements of the cross-modal sensor fusion technique, as described herein, may be implemented. It should be noted that any boxes that are represented by broken or dashed lines in FIG. 9 represent alternate embodiments of the simplified computing device, and that any or all of these alternate embodiments, as described below, may be used in combination with other alternate embodiments that are described throughout this document.

For example, FIG. 9 shows a general system diagram showing a simplified computing device 900. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the cross-modal sensor fusion technique, the device should have a sufficient computational capability and system memory to enable basic computational operations. In particular, as illustrated by FIG. 9, the computational capability is generally illustrated by one or more processing unit(s) 910, and may also include one or more GPUs 915, either or both in communication with system memory 920. Note that that the processing unit(s) 910 of the general computing device may be specialized microprocessors, such as a DSP, a VLIW, or other micro-controller, or can be conventional CPUs having one or more processing cores, including specialized GPU-based cores in a multi-core CPU. When used in special purpose devices such as the cross-modal sensor fusion technique, the computing device can be implemented as an ASIC or FPGA, for example.

In addition, the simplified computing device of FIG. 9 may also include other components, such as, for example, a communications interface 930. The simplified computing device of FIG. 9 may also include one or more conventional computer input devices 940 (e.g., pointing devices, keyboards, audio and speech input devices, video input devices, haptic input devices, devices for receiving wired or wireless data transmissions, etc.). The simplified computing device of FIG. 9 may also include other optional components, such as, for example, one or more conventional computer output devices 950 (e.g., display device(s) 955, audio output devices, video output devices, devices for transmitting wired or wireless data transmissions, etc.). Note that typical communications interfaces 930, input devices 940, output devices 950, and storage devices 960 for general-purpose computers are well known to those skilled in the art, and will not be described in detail herein.

The simplified computing device of FIG. 9 may also include a variety of computer readable media. Computer readable media can be any available media that can be accessed by computer 900 via storage devices 960 and includes both volatile and nonvolatile media that is either removable 970 and/or non-removable 980, for storage of information such as computer-readable or computer-executable instructions, data structures, program modules, or other data. Computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of any of the above should also be included within the scope of communication media.

Further, software, programs, and/or computer program products embodying some or all of the various embodiments of the cross-modal sensor fusion technique described herein, or portions thereof, may be stored, received, transmitted, or read from any desired combination of computer or machine readable media or storage devices and communication media in the form of computer executable instructions or other data structures.

Finally, the cross-modal sensor fusion technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for locating an object to which a device is rigidly attached, comprising:
   receiving, device motion features expressed in terms of device velocities or device accelerations from sensors on the device;
   capturing images of the device and the object to which it is rigidly attached;
   finding image motion features expressed in terms of image velocities or image accelerations in the captured images, wherein image motion features are found by using a flow at a point in an image to measure the velocity of the object under that point and wherein patches of the image are tracked to estimate the acceleration of a given patch of the object as it moves in the image;
   in a common coordinate system, matching the device velocities with the image velocities or matching the device accelerations with image accelerations, depending on which type of motion features are used, by:
      computing on a per pixel basis the difference between the image motion features and the device motion features at a number of pixel locations in one or more of the captured images; and
      determining the location of the device and any rigidly attached object in an image as the location of the smallest difference between the device motion features and image motion features in the coordinates of the common coordinate system.

2. The computer-implemented process of claim 1 wherein the number of pixel locations is every pixel in an image.

3. The computer-implemented process of claim 1 wherein the image motion features and the device motion features are expressed in terms of image velocities and device velocities, respectively, and wherein the image velocities of the image motion features are found by computing the velocity for all of the pixels in an image using an optical flow technique.

4. The computer-implemented process of claim 3 wherein the optical flow is computed from a current image frame at time t to a previous image frame at time t−1.

5. The computer-implemented process of claim 1 wherein the common coordinate system is a real world coordinate system.

6. The computer-implemented process of claim 1 wherein the device captures real-time device orientation.

7. The computer-implemented process of claim 6 wherein the device reports device orientation to a standard east, north, up (ENU) coordinate system.

8. The computer-implemented process of claim 1 wherein the image motion features and the device motion features are expressed in terms of image accelerations and device accelerations, respectively.

9. The computer-implemented process of claim 8, wherein the image accelerations of the image motion features in an image are found by:
   computing the velocity of movement for all of the pixels in the image using an optical flow technique;
   augmenting the computed velocity of movement for the pixels in the image by corresponding depth information;
   converting the augmented velocity of movement for the pixels in the image into a three dimensional coordinate system of the device; and
   estimating acceleration for all the pixels in the image in three dimensional coordinates using the converted augmented velocity of movement.

10. The computer-implemented process of claim 9 wherein the acceleration at a pixel is estimated using a Kalman filter.

11. The computer-implemented process of claim 10 wherein the Kalman filter uses the flow at a point in the image to measure the velocity of an object under that point and tracks patches of the image whose motion is being estimated to estimate the acceleration of a given patch of an object as it moves in the image.

12. The computer-implemented process of claim 9 wherein the optical flow information at a point in an image is a measurement of the velocity of an object under that point.

13. The computer-implemented process of claim 9 wherein optical flow information is used to track patches of image whose motion is being estimated.

14. The computer-implemented process of claim 1 wherein matching device motion features and image motion features in a common coordinate system further comprises:
   obtaining a camera's orientation that captures an image with respect to a coordinate frame of the mobile device;
   transforming motion observed in the captured image to the coordinate frame of the mobile device to obtain a difference.

15. The computer-implemented process of claim 1 wherein no predetermined model of the device nor an object rigidly attached to the device is required in order to determine the presence of the device or an object rigidly attached to the device.

16. A computer-implemented process for determining the location of a mobile device, comprising:
   determining mobile device three-dimensional (3D) acceleration in a real-world coordinate system;
   simultaneously with the capture of the mobile device's 3D acceleration, capturing color and depth images of the mobile device;
   finding 2D image motion in the captured images by computing a dense optical flow of flow vectors on the captured color images by using the flow at points in a chosen image to measure the velocity of an object under each point;
   converting each flow vector to a 3D motion using the depth images;
   transforming each flow vector to the real-world coordinate system of the mobile device;
   estimating 3D image acceleration from the transformed flow vectors by tracking patches of the image whose motion is being estimated to estimate the acceleration of a given patch of an object as it moves in the image;
   matching the 3D image acceleration with the 3D acceleration of the mobile device;
   on a point by point basis computing the difference between the 3D image acceleration and the 3D device acceleration at a number of point locations in the captured colored images; and
   determining the smallest difference value between the 3D image acceleration and the 3D device acceleration in an image as the presence of the device at that point in real-world coordinates.

17. The computer-implemented process of claim 16 wherein the 3D image acceleration is estimated by a Kalman filter at each point of the image, with the 3D flow at the point provided as input.

18. A system for determining mobile device location, comprising:
- a computing device;
- a computer program comprising sub-programs stored on one or more storage devices and executable by the computing device, wherein the computing device is directed by the sub-programs of the computer program to,
- receive mobile device 3D accelerations from sensors on the mobile device;
- determine 3D image accelerations in images captured of the mobile device by a depth camera simultaneously with the 3D device accelerations received from the mobile device wherein the 3D image accelerations are determined by tracking patches of an image whose motion is being estimated to estimate the acceleration of a given patch of an object as it moves in the image whose motion is being estimated;
- in a common coordinate system, on a per pixel basis compute the differences between the 3D device accelerations and the 3D image accelerations at a number of pixel locations in the captured images; and
- determine the 3D location of the mobile device as a pixel location in an image where the 3D acceleration differences are the smallest.

19. The system of claim 18 wherein there is no direct line of sight to the mobile device when capturing images of the mobile device.

20. The system of claim 18 wherein the differences between 3D device accelerations and 3D image accelerations are smoothed.

* * * * *